(12) United States Patent
Joshi et al.

(10) Patent No.: US 10,071,820 B2
(45) Date of Patent: Sep. 11, 2018

(54) INCLEMENT WEATHER DETECTION FOR AIRCRAFT ENGINES

(71) Applicant: PRATT & WHITNEY CANADA CORP., Longueuil (CA)

(72) Inventors: Ninad Joshi, Brampton (CA); Andrea Lindsay Henning, Toronto (CA); Faran Hafeez, Mississauga (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 0 days.

(21) Appl. No.: 15/269,384

(22) Filed: Sep. 19, 2016

(65) Prior Publication Data

US 2018/0079520 A1    Mar. 22, 2018

(51) Int. Cl.
*B64D 45/00*   (2006.01)
*B64D 31/06*   (2006.01)
*F02C 9/28*    (2006.01)
*B64D 27/00*   (2006.01)
*G01H 1/00*    (2006.01)
*G01W 1/06*    (2006.01)
*G01W 1/02*    (2006.01)

(52) U.S. Cl.
CPC ............ *B64D 45/00* (2013.01); *B64D 27/00* (2013.01); *B64D 31/06* (2013.01); *F02C 9/28* (2013.01); *G01H 1/006* (2013.01); *G01W 1/02* (2013.01); *G01W 1/06* (2013.01); *B64D 2045/0085* (2013.01); *G01W 2203/00* (2013.01)

(58) Field of Classification Search
CPC ........ B64C 13/16; B64D 31/06; B64D 45/00; B64D 2045/0085; F02C 9/28; G08G 5/0091; G01W 1/00; G01W 1/02; G01W 1/06; G01W 1/10; G01W 2001/003; G01H 1/006; G01M 15/14
See application file for complete search history.

(56) References Cited

U.S. PATENT DOCUMENTS 3,798,626 A * 3/1974 Weichbrodt ............. F02C 7/05
                                                 340/669
6,937,937 B1 * 8/2005 Manfred ................. G01W 1/10
                                                 340/971
7,222,002 B2 * 5/2007 Maine ................... G01M 15/12
                                                 701/100

(Continued)

OTHER PUBLICATIONS

Airbus, "Flight operations briefing notes: Supplementary techniques, handling engine malfunctions", Seq 07, Dec. 2006, 17 pages (Year: 2006).*

(Continued)

*Primary Examiner* — Behrang Badii
*Assistant Examiner* — David A Testardi
(74) *Attorney, Agent, or Firm* — Norton Rose Fulbright Canada LLP

(57) ABSTRACT

Methods and systems for detecting inclement weather in the vicinity of an aircraft engine are described. Vibration levels of the engine are monitored. Upon detection of an increase in the vibration levels beyond a threshold, an alert mode is triggered. At least one predetermined performance parameter is monitored while in the alert mode, and inclement weather is detected when the at least one predetermined performance parameter meets at least one inclement weather condition.

20 Claims, 5 Drawing Sheets

(56) References Cited

U.S. PATENT DOCUMENTS

| | | | | |
|---|---|---|---|---|
| 7,698,927 B2* | 4/2010 | Spinelli | ............ | G01N 25/58 73/29.01 |
| 7,982,658 B2* | 7/2011 | Kauffman | ............ | G01S 13/953 342/26 B |
| 8,051,701 B2* | 11/2011 | Spinelli | ............ | G01N 25/58 73/170.16 |
| 8,085,182 B2* | 12/2011 | Kauffman | ............ | G01S 7/22 342/26 B |
| 8,459,103 B2 | 6/2013 | Khibnik et al. | | |
| 8,800,354 B2* | 8/2014 | Shoda | ............ | G01M 15/00 73/112.01 |
| 8,818,683 B2* | 8/2014 | van der Merwe | ............ | F01D 21/003 700/100 |
| 8,869,537 B2 | 10/2014 | Geis et al. | | |
| 8,869,603 B2 | 10/2014 | Epstein et al. | | |
| 9,046,040 B2 | 6/2015 | Djelassi et al. | | |
| 9,324,037 B2* | 4/2016 | Losl | ............ | G06N 99/005 |
| 2002/0103547 A1* | 8/2002 | Nomura | ............ | F02C 9/18 700/29 |
| 2004/0244476 A1* | 12/2004 | Andrews | ............ | G01W 1/08 73/170.01 |
| 2004/0249520 A1* | 12/2004 | Maine | ............ | G01M 15/12 701/3 |
| 2008/0302081 A1* | 12/2008 | Snell | ............ | F01D 21/10 60/39.093 |
| 2009/0306839 A1* | 12/2009 | Youngquist | ............ | G01K 7/021 701/14 |
| 2011/0079015 A1* | 4/2011 | Geis | ............ | F01D 17/02 60/779 |
| 2011/0219741 A1* | 9/2011 | Ernst | ............ | F01D 21/003 60/39.15 |
| 2013/0099944 A1* | 4/2013 | Hanson | ............ | F01D 21/10 340/962 |
| 2016/0202168 A1* | 7/2016 | Knobloch | ............ | B64D 45/00 701/3 |
| 2016/0230677 A1* | 8/2016 | Feulner | ............ | F02C 9/28 |
| 2017/0121027 A1* | 5/2017 | Visser | ............ | B64D 31/06 |
| 2017/0121028 A1* | 5/2017 | Visser | ............ | B64D 31/06 |
| 2017/0175714 A1* | 6/2017 | Asheim | ............ | F03D 17/00 |

OTHER PUBLICATIONS

Balicki, Wlodzimierz et al., "Effect of the Atmosphere on the Performances of Aviation Turbine Engines", Acta Mechanica et Automatica, vol. 8, No. 2, 2014, pp. 70-73 (Year: 2014).*

Barragan, Jorge Moreno, "Engine Vibration Monitoring and Diagnosis Based on On-Board Captured Data", Paper (SYB) 7 from RTO AVT Symp. on "Ageing Mechanisms and Control: Part B—Monitoring and Management of Gas Turbine Fleets for Extended Life and Reduced Costs", Manchester, UK, Oct. 8-11, 2001, 14 pp (Year: 2001).*

Santa, Imre, "The effect of water ingestion on the operation of the gas turbine engine", ICAS 2000 Congress, Paper 524, 9 pages (Year: 2000).*

* cited by examiner

INCLEMENT WEATHER DETECTION FOR AIRCRAFT ENGINES

TECHNICAL FIELD

The application relates generally to detecting inclement weather conditions for aircraft engines and more particularly, to detecting inclement weather based on engine vibrations.

BACKGROUND OF THE ART

An engine flameout refers to unintended shutdown of an engine due to the extinction of flames in the combustion chamber. In some cases, inclement weather conditions may be responsible for an engine flameout, for example due to ingested ice or water during a rain storm and/or a hail storm. For this reason, there are various techniques used to avoid engine flameout.

Many efforts focus on the coping strategies to deal with inclement weather, which may include increasing fuel flow, altering inlet-guide-vanes, adjusting bleed extraction, or a combination thereof. However, the need to properly detect inclement weather, and particularly performing early detection, has largely been overlooked.

SUMMARY

In one aspect, there is provided a method for detecting inclement weather in the vicinity of an aircraft engine. The method comprises monitoring vibration levels of the engine, upon detection of an increase in the vibration levels beyond a threshold, triggering an alert mode, monitoring at least one predetermined performance parameter while in the alert mode, and detecting inclement weather when the at least one predetermined performance parameter meets at least one inclement weather condition.

In another aspect, there is provided a system for detecting inclement weather in the vicinity of an aircraft engine. The system comprises a processing unit and a non-transitory memory communicatively coupled to the processing unit and comprising computer-readable program instructions. The instructions are executable by the processing unit for monitoring vibration levels of the engine, upon detection of an increase in the vibration levels beyond a threshold, triggering an alert mode, monitoring at least one predetermined performance parameter while in the alert mode, and detecting inclement weather when the at least one predetermined performance parameter meets at least one inclement weather condition.

In yet another aspect, there is provided a non-transitory computer readable medium having stored thereon program code executable by a processor for detecting a shaft event in a gas turbine engine. The program code comprises instructions for monitoring vibration levels of the engine, upon detection of an increase in the vibration levels beyond a threshold, triggering an alert mode, monitoring at least one predetermined performance parameter while in the alert mode, and detecting inclement weather when the at least one predetermined performance parameter meets at least one inclement weather condition.

DESCRIPTION OF THE DRAWINGS

Reference is now made to the accompanying figures in which.

DETAILED DESCRIPTION

There is described herein methods and systems for detecting inclement weather inflight for an aircraft having a gas turbine engine. Inclement weather refers to any weather condition which includes rain, hail, ice, sleet, snow, freezing rain, and/or a combination thereof. Engine vibrations are used as a gate to trigger further investigation of additional symptoms indicative of inclement weather. Once the additional symptoms are confirmed, a corrective response may be commanded.

Figure 1:
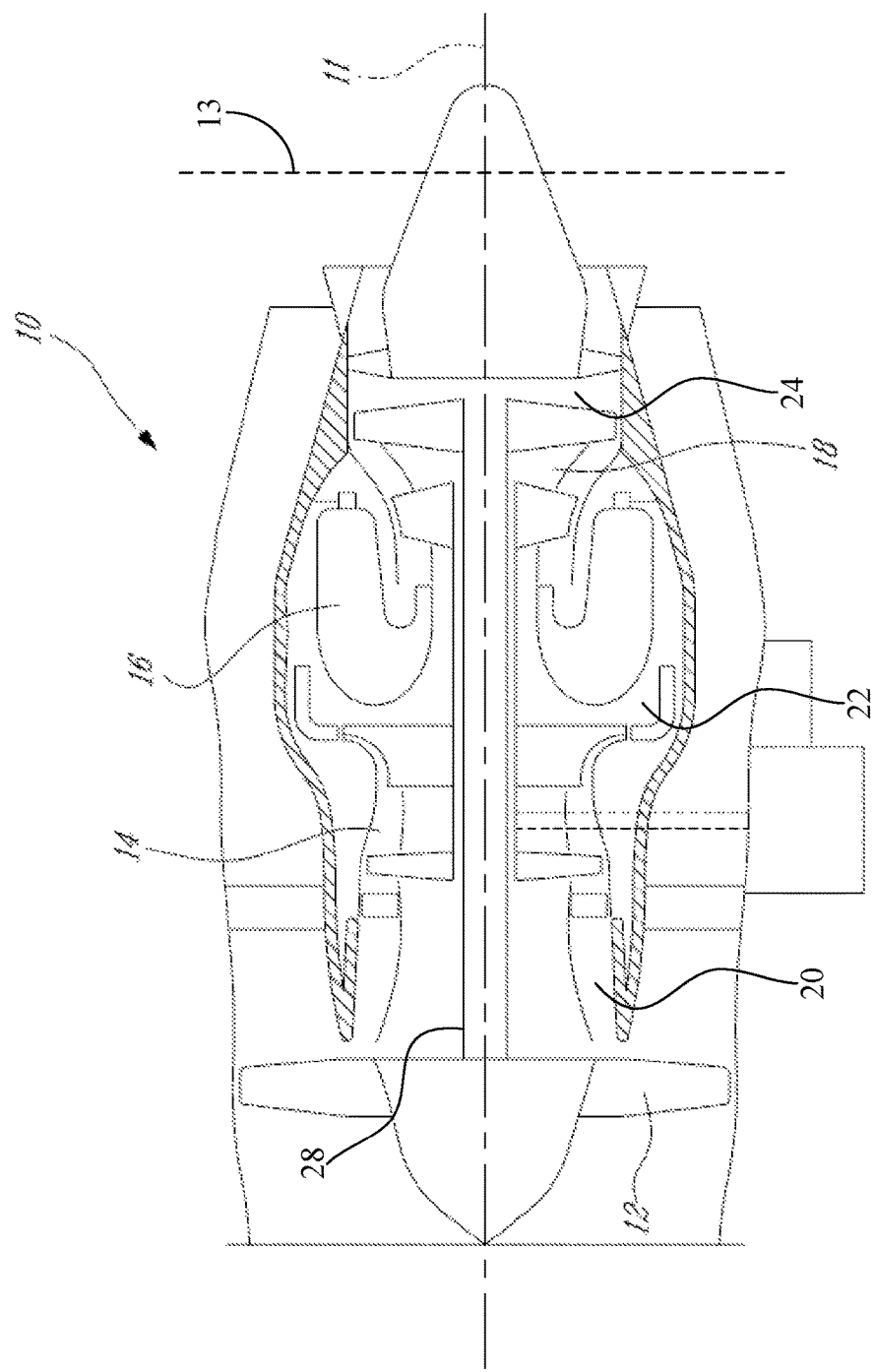
FIG. 1 is a schematic cross-sectional view of a gas turbine engine in accordance with one embodiment.

FIG. 1 illustrates a gas turbine engine 10 to which the detection methods and systems may be applied. Note that while engine 10 is a turbofan engine, the detection methods and systems may be applicable to turboprop, turboshaft, and other types of gas turbine engines.

Engine 10 generally comprises in serial flow communication: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Axis 11 defines an axial direction of the engine 10. Axis 13 defines a radial direction of the engine 10. In some embodiments, a low pressure spool is composed of a low pressure shaft and a low pressure turbine. The low pressure shaft drives the propeller 12. A high pressure spool is composed of a high pressure turbine attached to a high-pressure shaft, which is connected to the compressor section 14.

Figure 2:
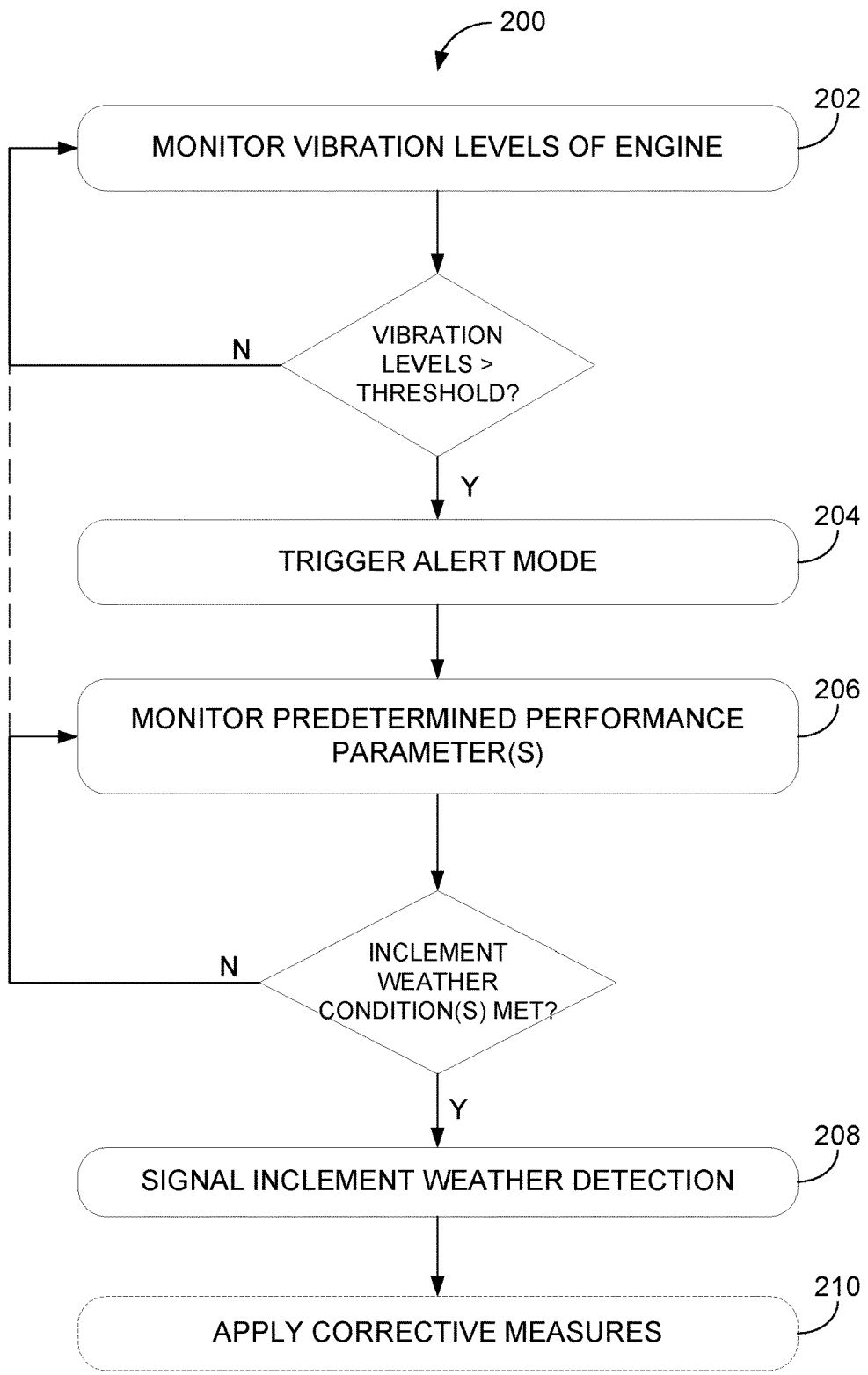
FIG. 2 is a flowchart of an example method for detecting inclement weather from an aircraft engine.

Referring to FIG. 2, there is illustrated an embodiment of a method 200 for detecting inclement weather via an aircraft engine, such as engine 10. At step 202, vibration levels of the engine are monitored. In some embodiments, the vibration levels are monitored continuously, using one or more measuring device such as vibration sensors. In some embodiments, vibration levels are monitored periodically, for example by polling the vibration sensors or by having the vibration sensors push data out regularly. The vibration sensors may be mounted directly to the engine, or adjacent thereto, such as on a fan case or another housing portion on the nacelle or elsewhere. In some embodiments, the vibration sensors are positioned to measure a velocity or displacement of a shaft 28 of the engine 10. In another embodiment, the vibration sensors may be positioned to measure similar parameters on a different shaft, such as a high pressure shaft or another shaft. Alternatively, or in combination therewith, the vibration sensors are positioned to measure a rotational motion of the fan 12. The vibration sensors may be located anywhere along the axis 11 of the engine 10, about a periphery of the engine 10, at a position in between the shaft 28 and the periphery of the engine 10, or a combination thereof. For example, there may be a plurality of sensors positioned throughout the engine, some adjacent to the fan 12, others along the shaft 28, and yet others around an outer periphery. The outputs of the various sensors positioned throughout the engine may be combined to obtain a single vibration level, or they may be used comparatively to validate a determined vibration level.

The vibration sensors may be any type of measuring device capable of sensing vibration, acceleration, displacement, or a combination thereof. For example, the sensors may be piezoelectric sensors that use the piezoelectric effect to measure changes in acceleration. The vibration sensors may be integrated circuits (IC) and/or programmable. The vibration sensors may be capable of measuring one or multiple axial directions of motion, such as tri-axial accelerometers. Note that microphones may be used to supplement vibration measurements obtained from the vibration sensors, by taking into account sound. This is done by measuring the dynamic pressure at single or multiple locations on the engine 10. The term "measurement devices" is used herein to encompass sensors and/or microphones.

In some embodiments, monitoring vibration levels comprises performing a comparison of measured vibration levels to reference vibration levels. The reference vibration levels may be provided in a look-up table, an equation, or any other comparable format. An increase in the vibration levels is detected when the measured vibration levels exceed the reference vibration levels by a given amount. The reference vibration levels correspond to vibration levels known to be indicative of normal engine operation in nominal conditions. They may be obtained through testing, simulations, or simply as prior recordings of the vibration levels of the engine 10. The reference vibration levels may be engine-specific, aircraft specific, mission specific, or according to any other characteristic which may cause vibration levels to differ from one inflight situation to another in similar flight conditions.

When an increase in vibration levels beyond a threshold has been detected, an alert mode is triggered at step 204. The alert mode causes at least one predetermined performance parameter to be monitored, as per step 206, in order to confirm an inclement weather condition. The inclement weather condition must be detected before triggering a corrective response to be applied to the engine 10.

Note that the time delay between monitoring vibration levels at step 202, triggering the alert mode at step 204, and monitoring predetermined performance parameters at step 206 may be of the order of 1 millisecond or less, depending on the capabilities of the system. In some embodiments, the transition from step 202 to step 204 occurs over one clock cycle in the engine computer, and step 206 begins immediately once the alert mode is triggered. Other time delays may be used.

In some embodiments, the predetermined performance parameters correspond to thrust lever angle (TLA) position, fuel flow ($W_f$), high pressure spool speed ($N_2$), and compressor outlet pressure ($P_3$). The inclement weather condition corresponds to a specific combination of the performance parameters and when the conditions are satisfied, the inclement weather detection is signalled as per step 208. For example, if the TLA is fixed, $W_f/P_3$ increases, and $N_2$ changes, the inclement weather condition is satisfied. Other embodiments may include different locations for the pressure measurement, such as upstream at the compressor inlet 20 ($P_2$) or downstream at the turbine outlet 24 ($P_5$). Similarly, $P_3$ may be deduced or calculated using other pressure measurements, such as $P_2$, $P_5$, and the like.

The compressor discharge pressure $P_3$ may be replaced by a pair of temperatures, i.e. a temperature reading at a first location and a temperature reading at a second location, downstream from the first location. In some embodiments, the first location corresponds to the compressor inlet 20 (referred to as $T_2$) and the second location corresponds to a compressor outlet 22 (referred to as $T_3$). In this case, the inclement weather condition is satisfied when the TLA is fixed, $W_f$ increases, $T_3/T_2$ decreases, and $N_2$ changes. In other embodiments, the first location corresponds to $T_2$ and the second location corresponds to the turbine outlet 24 (referred to as $T_5$). In this case, the inclement weather condition is satisfied when the TLA is fixed, $W_f$ increases, $T_5/T_2$ decreases, and $N_2$ changes. Other locations for the temperature readings may be used. In addition, $T_2$, $T_3$, and/or $T_5$ may be deduced and/or calculated using temperature measurements form other locations. Other predetermined performance parameters may be used, such as the total or static pressure at the output of a high pressure compressor (P28 or S28).

In some embodiments, corrective measures are applied to the engine 10 once inclement weather has been detected, as per step 210. Some example corrective measures include, but are not limited to, increasing fuel flow, changing a position of one or more bleed-off valve (BOV), changing a position of one or more inlet guide vane (IGV), altering one or more bleed flow, and any combination thereof.

In some embodiments, the method 200 continues to monitor vibration levels of the engine 10 after alert mode has been triggered. If vibration levels are subsequently found to decrease below the threshold levels, alert mode is removed and the predetermined performance parameters are no longer monitored.

The method 200 may further be adapted to discard vibrations due to engine imbalance while retaining vibrations due to incident turbulence. Indeed, inclement weather is typically preceded by an ingested turbulence on the fan 12 of the engine 10, which results in an increase in the vibration levels of the fan 12. However, these specific vibrations differ from vibrations due to engine imbalance, which may be encountered due to a blade-off event or to the wear and tear of the fan 12. In some embodiments, the two types of engine vibrations are differentiated based on a direction of impingement of the vibrations. In particular, vibrations due to incident turbulence are triggered in the axial direction 11 of the engine 10 due to momentum transfer from the precipitations (i.e. rain, hail, ice, snow, etc), whereas vibrations due to rotor imbalance are triggered in the radial direction 13 of the engine. Vibration data may thus be obtained using, for example, a tri-axial accelerometer, and processed to determine a direction of action so as to consider only vibrations due to incident turbulence.

In an alternative embodiment, measured vibration levels may be compared to a history of vibration levels for a same engine and/or a same aircraft. A comparative analysis may thus be used to discard vibrations due to rotor imbalance and/or to trigger the alert mode.

Figure 3:
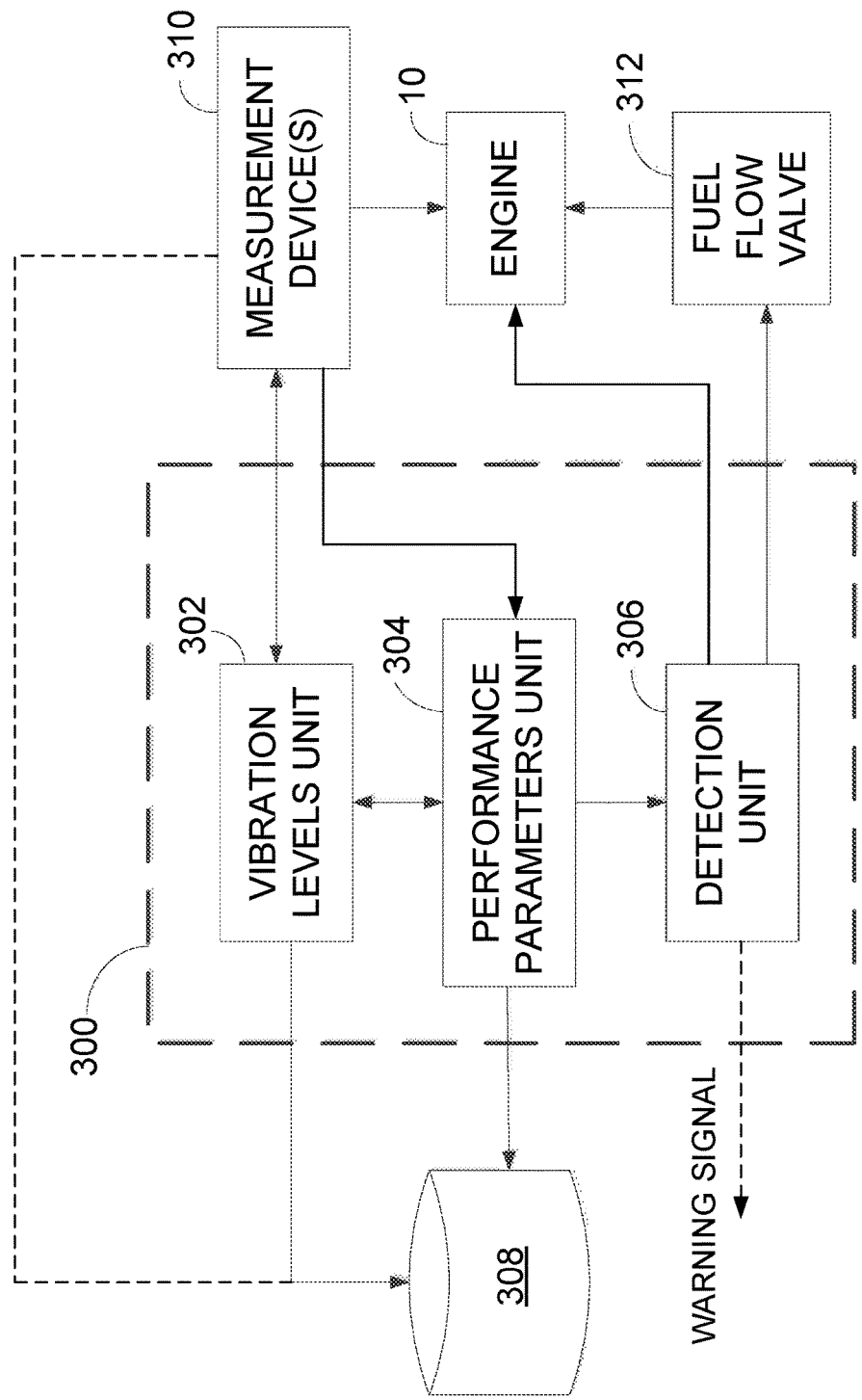
FIG. 3 is a block diagram of an example system for detecting inclement weather from an aircraft engine.

Referring to FIG. 3, there is illustrated an example embodiment of an inclement weather detector 300. The inclement weather detector 300 illustratively comprises a vibrations level unit 302, a performance parameters unit 304, and a detection unit 306. The inclement weather detector 300 is operatively connected to a storage medium 308, for storing data thereto and/or retrieving data therefrom. At least one measurement device 310 obtains measurements such as vibration levels, pressure, temperature, high pressure spool speed, and the like, and provides these measurements to the storage medium 308 and/or the detector 300. For example, vibration sensors may provide vibration measurements directly to the vibrations levels unit 302, which is configured for monitoring the vibration levels of the engine 10, as per step 202 of the method 200, and to trigger the alert mode (step 204) upon detection of an increase in the vibration levels beyond a threshold.

Once the alert mode has been triggered, the performance parameters unit 304 is configured for monitoring at least one predetermined performance parameter, as per step 206. The predetermined performance parameters may be obtained directly from the measurement devices 310 or they may be retrieved from the storage medium 308. In some embodiments, the performance parameters unit 304 will receive the measured values from the measurement devices 310 and subsequently store them in the storage medium 308. The measurement devices 310 may thus comprise temperature sensors, pressure sensors, speed sensors, and any other type of sensor needed to measure the performance parameters. In some embodiments, the performance parameters may be obtained through another system of the aircraft, for example TLA.

The performance parameters unit 304 may be configured for advising the detection unit 306 when an inclement weather condition has been met. The detection unit 306 will then signal an inclement weather detection, for example as a warning signal to another component/system of the aircraft or as a warning signal to an aircraft instrumentation panel inside a cockpit.

In some embodiments, the detection unit 306 may be configured to apply corrective measures to the engine 10, for example by modifying the IGV and/or by controlling fuel flow to the engine 10 via a fuel flow valve 312.

The detector 300 may be implemented in various manners, such as in software on a processor, on a programmable chip, on an Application Specific Integrated Chip (ASIC), or as a hardware circuit. In some embodiments, the detector 300 is implemented in hardware on a dedicated circuit board located inside an Electronic Engine Controller (EEC) or an Engine Control Unit (ECU). The EEC or ECU may be provided as part of a Full Authority Digital Engine Control (FADEC) of an aircraft. In some cases, a processor may be used to communicate information to the circuit, such as high pressure spool speed and/or TLA position. In other embodiments, the detector 300 is implemented in a digital processor. In some embodiments, the FADEC performs the increase in fuel flow once inclement weather has been detected.

Figure 4:
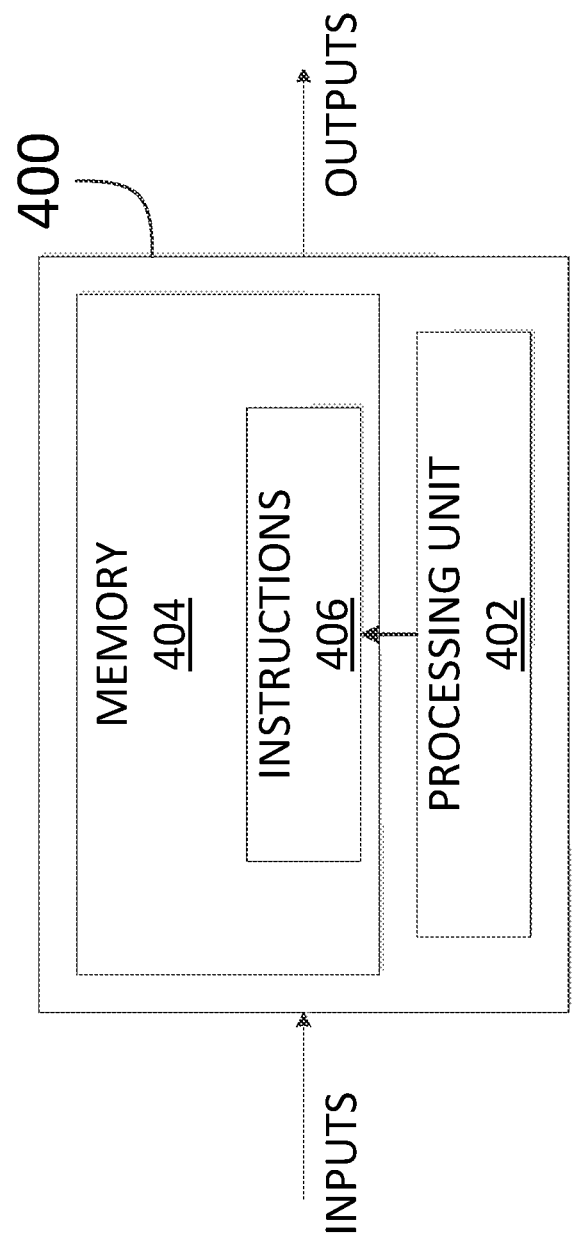
FIG. 4 is block diagram of an example implementation of an inclement weather detector in a computing device.

An example embodiment of the detector 300 is illustrated in FIG. 4. A computing device 400 may comprise, amongst other things, a processing unit 402 and a memory 404 which has stored therein computer-executable instructions 406. The processing unit 402 may comprise any suitable devices configured to cause a series of steps to be performed so as to implement the method 200 such that instructions 406, when executed by the computing device 400 or other programmable apparatus, may cause the functions/acts/steps specified in the methods described herein to be executed. The processing unit 402 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 404 may comprise any suitable machine-readable storage medium. The memory 404 may comprise non-transitory computer readable storage medium such as, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device 400, such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory 404 may comprise any storage means (e.g., devices) suitable for retrievably storing machine-readable instructions executable by processing unit. The memory 404 may correspond to or include storage medium 308.

In some embodiments, the computing device 400 sends one or more control signals directly to fuel valves for controlling fuel flow, or for initiating one or more other coping strategy. In other embodiments, the control signals are sent to an intermediary unit (not shown), which translates the control signals sent by the computing device 400 into signals to be sent to the fuel valves.

Figure 5A:
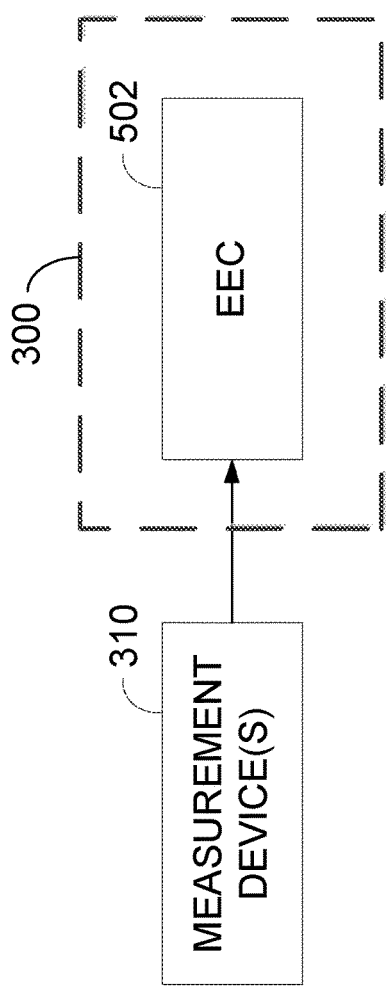
FIGS. 5A and 5B are block diagrams of example hardware embodiments of the inclement weather detector.
Figure 5B:
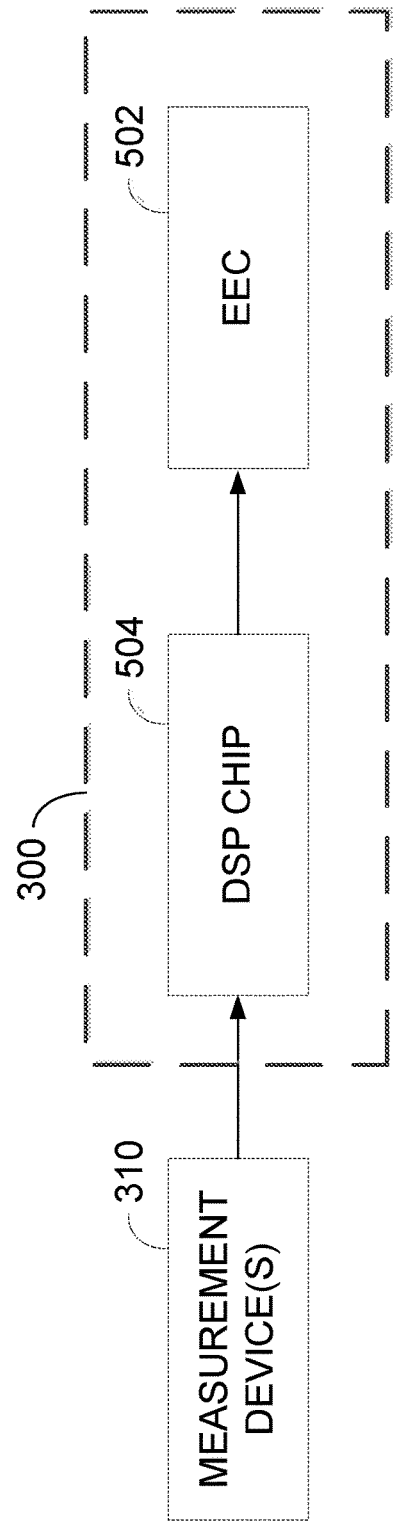

FIGS. 5A and 5B illustrate example embodiments for implementing the detector 300 in hardware. In FIG. 5A, the detector 300 is shown as being entirely provided in an electronic engine controller (EEC) 502. In FIG. 5B, the detector is shown as being composed of a digital signal processing (DSP) chip 504 and an EEC 502. In this example, the DSP chip 504 may be configured to perform steps 202 to 208, and the warning signal is transmitted to the EEC 502, where corrective measures are applied. Alternatively, the DSP chip 504 may be configured to perform steps 202 to 206 and the EEC 502 is configured to perform step 208 and optionally step 210. In yet another alternative embodiment, DSP chip 504 is configured to perform steps 202 and 204, i.e. monitor vibration levels and trigger the alert mode, respectively, and the EEC 502 is configured to perform steps 206 to 208 and optionally 210. It should be understood that other configurations may also apply, or apply in the alternative, such as providing three separate components for performing the three stages of the method 200, i.e. a DSP chip 504 for monitoring vibration levels and triggering the alert mode (steps 202, 204), another component (not shown) such as an integrated circuit or an FPGA for monitoring performance parameters and signaling an inclement weather detection (steps 206, 208), and the EEC 502 for applying corrective measures (step 210).

The methods and systems for detecting inclement weather described herein may be implemented in a high level procedural or object oriented programming or scripting language, or a combination thereof, to communicate with or assist in the operation of a computer system, for example the computing device 400. Alternatively, the methods and systems for detecting inclement weather may be implemented in assembly or machine language. The language may be a compiled or interpreted language. Program code for implementing the methods and systems for detecting inclement weather may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting inclement weather may be considered to be implemented by way of a non-transitory computer-readable storage medium having a computer program stored thereon. The computer program may comprise computer-readable instructions which cause a computer, or more specifically the processing unit 402 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

All embodiments described herein may work on instantaneous measured values, a moving average of the measured values, or any other mathematical function of the measured parameters.

The methods and systems for detecting inclement weather described herein have been shown to decrease engine response time. In particular, utilizing engine vibrations to forewarn the engine of the possibility of inclement weather allows the engine computer to cut down on monitoring time for other sensitive parameters before taking correct measures to avoid a flame-out. In addition, the logic is designed to integration with existing engine control hardware and software architecture, thereby reducing implementation costs.

Various aspects of the methods and systems for detecting inclement weather may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for detecting inclement weather in the vicinity of an aircraft engine, the method comprising:
   monitoring vibration levels of the engine;
   upon detection of an increase in the vibration levels beyond a threshold, triggering an alert mode within an engine controller of the engine;
   monitoring at least one predetermined performance parameter of the engine while in the alert mode;
   detecting inclement weather when the at least one predetermined performance parameter of the engine corresponds to at least one inclement weather condition indicative of the inclement weather; and
   applying at least one corrective measure to the engine when the inclement weather has been detected.

2. The method of claim 1, wherein monitoring vibration levels comprises comparing measured vibration levels to reference vibration levels, and the increase in the vibration levels is detected when the measured vibration levels exceed the reference vibration levels by a given amount.

3. The method of claim 2, wherein the reference vibration levels are vibration levels previously measured from the aircraft engine prior to triggering the alert mode.

4. The method of claim 1, wherein the at least one predetermined performance parameter comprises a thrust lever angle (TLA) position, fuel flow, compressor discharge pressure, and high pressure spool speed, and wherein the at least one inclement weather condition comprises an uncommanded change in high pressure spool speed accompanied by an increase in a ratio of fuel flow to compressor discharge pressure.

5. The method of claim 1, wherein the at least one predetermined performance parameter comprises a thrust lever angle (TLA) position, a first temperature reading at a first location and a second temperature reading at a second location, and wherein the at least one inclement weather condition comprises a decrease in a ratio of the second temperature to the first temperature at a fixed TLA position.

6. The method of claim 1, further comprising continuing to monitor the vibration levels of the engine while in the alert mode, and removing the alert mode within the engine controller when the vibration levels decrease below the threshold.

7. The method of claim 1, wherein monitoring vibration levels of the engine comprises discarding vibrations due to engine imbalance.

8. The method of claim 7, wherein vibrations due to engine imbalance are identified as occurring in a radial direction of the engine whereas vibrations due to incident turbulence are identified as occurring in an axial direction of the engine.

9. The method of claim 1, wherein the at least one corrective measure comprises at least one of increasing fuel flow, changing a position of at least one bleed-off valve, changing a position of at least one inlet (wide vane, and altering a bleed flow.

10. A system for detecting inclement weather in the vicinity of an aircraft engine, the system comprising:
    a processing unit; and
    a non-transitory memory communicatively coupled to the processing unit and comprising computer-readable program instructions executable by the processing unit for:
      monitoring vibration levels of the engine;
      upon detection of an increase in the vibration levels beyond a threshold, triggering an alert mode;
      monitoring at least one predetermined performance parameter of the engine while in the alert mode;
      detecting inclement weather when the at least one predetermined performance parameter of the engine corresponds to at least one inclement weather condition indicative of the inclement weather; and
      causing at least one corrective measure to be applied to the engine when the inclement weather has been detected.

11. The system of claim 10, further comprising at least one vibration sensor operatively connected to the processing unit and configured for measuring the vibration levels of the engine at one or more locations.

12. The system of claim 11, wherein the at least one vibration sensor comprises at least one tri-axial vibration sensor.

13. The system of claim 12, wherein monitoring vibration levels of the engine comprises discarding vibrations due to engine imbalance, identified as occurring in a radial direction of the engine, and retaining vibrations due to incident turbulence, identified as occurring in an axial direction of the engine.

14. The system of claim 12, wherein the processing unit comprises:
    a digital signal processing chip coupled to the at least one tri-axial vibration sensor and configured for monitoring the vibration levels of the engine and sending an alert mode signal when the alert mode is triggered; and an electronic engine controller coupled to the digital signal processing chip and configured for receiving the alert mode signal, monitoring the at least one predetermined performance parameter, and detecting the inclement weather.

15. The system of claim 11, wherein the processing unit comprises:
   a digital signal processing chip coupled to the at least one vibration sensor and configured for detecting the inclement weather and sending an inclement weather signal; and
   an electronic engine controller coupled to the digital signal processing chip and configured for receiving the inclement weather signal and applying at least one corrective measure to the engine in response to the inclement weather signal.

16. The system of claim 10, further comprising at least one microphone operatively connected to the processing unit and configured for measuring a dynamic pressure at one or more locations of the aircraft engine.

17. The system of claim 10, wherein the processing unit comprises an electronic engine controller.

18. The system of claim 10, wherein the at least one predetermined performance parameter comprises a thrust lever angle (TLA) position, fuel flow, compressor discharge pressure, and high pressure spool speed, and wherein the at least one inclement weather condition comprises an uncommanded change in high pressure spool speed accompanied by an increase in a ratio of fuel flow to compressor discharge pressure.

19. The system of claim 10, wherein the at least one predetermined performance parameter comprises a thrust lever angle (TLA) position, a first temperature reading at a first location and a second temperature reading at a second location, and wherein the at least one inclement weather condition comprises a decrease in a ratio of the second temperature to the first temperature at a fixed TLA position.

20. A non-transitory computer readable medium having stored thereon program code executable by a processor for detecting inclement weather in the vicinity of an aircraft engine, the program code comprising instructions for:
   monitoring vibration levels of the engine;
   upon detection of an increase in the vibration levels beyond a threshold, triggering an alert mode;
   monitoring at least one predetermined performance parameter of the engine while in the alert mode;
   detecting inclement weather when the at least one predetermined performance parameter of the engine corresponds to at least one inclement weather condition indicative of the inclement weather; and
   causing at least one corrective measure to be applied to the engine when the inclement weather has been detected.

* * * * *